US008719509B2

(12) United States Patent
Wang et al.

(10) Patent No.: US 8,719,509 B2
(45) Date of Patent: May 6, 2014

(54) CACHE IMPLEMENTING MULTIPLE REPLACEMENT POLICIES (71) Applicant: Apple Inc., Cupertino, CA (US)

(72) Inventors: James Wang, Vista, CA (US); Zongjian Chen, Palo Alto, CA (US); James B. Keller, Redwood City, CA (US); Timothy J. Millet, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/755,999

(22) Filed: Jan. 31, 2013

(65) Prior Publication Data

US 2013/0151781 A1     Jun. 13, 2013

Related U.S. Application Data (62) Division of application No. 12/500,768, filed on Jul. 10, 2009, now Pat. No. 8,392,658.

(51) Int. Cl.
*G06F 13/00* (2006.01)

(52) U.S. Cl.
USPC .............................. 711/133; 711/128; 711/159

(58) Field of Classification Search
CPC ............ G06F 12/0864; G06F 12/0866; G06F 12/12–12/128
USPC ......... 711/118, 128, 130, 133, 136, 141, 154, 711/159, 160
See application file for complete search history.

(56) References Cited

U.S. PATENT DOCUMENTS

| | | | |
|---|---|---|---|
| 5,481,691 A | | 1/1996 | Day, III et al. |
| 5,666,482 A | * | 9/1997 | McClure ....................... 714/6.13 |
| 5,715,427 A | | 2/1998 | Barrera et al. |
| 6,393,525 B1 | | 5/2002 | Wilkerson et al. |
| 6,493,797 B1 | | 12/2002 | Lee et al. |
| 6,931,493 B2 | | 8/2005 | Johns et al. |
| 7,260,679 B2 | | 8/2007 | Benhase et al. |
| 7,330,935 B2 | | 2/2008 | Yamazaki |
| 2003/0225976 A1 | | 12/2003 | Hokenek et al. |
| 2004/0059875 A1 | | 3/2004 | Garg et al. |
| 2009/0172289 A1 | * | 7/2009 | Yamamura et al. ............ 711/128 |

* cited by examiner

*Primary Examiner* — Sanjiv Shah
*Assistant Examiner* — Zhuo Li
(74) *Attorney, Agent, or Firm* — Lawrence J. Merkel; Meyertons, Hood, Kivlin, Kowert & Goetzel, P.C.

(57) ABSTRACT

In an embodiment, a cache stores tags for cache blocks stored in the cache. Each tag may include an indication identifying which of two or more replacement policies supported by the cache is in use for the corresponding cache block, and a replacement record indicating the status of the corresponding cache block in the replacement policy. Requests may include a replacement attribute that identifies the desired replacement policy for the cache block accessed by the request. If the request is a miss in the cache, a cache block storage location may be allocated to store the corresponding cache block. The tag associated with the cache block storage location may be updated to include the indication of the desired replacement policy, and the cache may manage the block in accordance with the policy. For example, in an embodiment, the cache may support both an LRR and an LRU policy.

19 Claims, 5 Drawing Sheets

CACHE IMPLEMENTING MULTIPLE REPLACEMENT POLICIES

This application is a divisional of U.S. patent application Ser. No. 12/500,768, filed on Jul. 10, 2009, which is incorporated herein by reference in its entirety.

BACKGROUND

1. Field of the Invention

This invention is related to the field of caches and, more particularly, to replacement policies in caches.

2. Description of the Related Art

Various components in a system may access system memory. For example, processors executing software may access memory to read the instructions that form the software and to access data that the instructions are manipulating. Fixed function components can also access memory (e.g. direct memory access (DMA) controllers, peripheral interface controllers on behalf of peripheral components, etc.). Generally, the system memory is constructed to maximize capacity without unduly lengthening latency. However, the latency to system memory may still be a significant factor limiting the performance of various components.

To reduce effective memory latency, system components may include caches or may be coupled to caches. For example, processors often include caches and may also be coupled to additional external caches in a cache memory hierarchy. Typically, caches can provide low latency access to a subset of the data that is also stored in the system memory. For example, caches can be hardware-managed memories that store recently accessed data, and the cache management hardware writes copies of data accessed by the processors to the cache. Similarly, caches to which other memory-reading components are coupled may write data accessed by such components to the cache. Data that has been modified can be replaced in the cache by newer data, and the cache management hardware can write the modified data back to the main memory. In some cases, the processors can include prefetch instructions and other cache hints to influence the operation of the cache management hardware and can mark memory non-cacheable to prevent caching, but generally software cannot control the cache management hardware.

One mechanism managed by the cache management hardware is the replacement of cached data when a cache miss occurs. There are various replacement policies that can be implemented to select cached data to be replaced. Each replacement policy is beneficial for some access patterns, and not as beneficial for others. Typically, the cache designer selects a replacement policy that is expected to perform best under expected work loads and that is expected to be implementable within the timing constraints of the design, and implements that replacement policy.

SUMMARY

In an embodiment, a cache stores tags for cache blocks stored in the cache. Each tag may include an indication identifying which of two or more replacement policies supported by the cache is in use for the corresponding cache block, and a replacement record indicating the status of the corresponding cache block in the replacement policy. Requests may include a replacement attribute that identifies the desired replacement policy for the cache block accessed by the request. If the request is a miss in the cache, a cache block storage location may be allocated to store the corresponding cache block. The tag associated with the cache block storage location may be updated to include the indication of the desired replacement policy, and the cache may manage the block in accordance with the policy.

For example, in an embodiment, the cache may support both a least recently replaced (LRR) and a least recently used (LRU) type of policy. Each request may select between the LRR and LRU policies, and thus a mix of cache blocks managed according to LRR or LRU policies may be stored in the cache. Those cache blocks whose access patterns may benefit from the LRR policy may be managed using LRR, and other cache blocks whose access patterns may benefit from the LRU policy may be managed using LRU. In an embodiment, the cache is set associative and the replacement records of the set may be updated according to the LRU policy on allocation of a cache block, even if the cache block is LRR. Updates to the replacement records in response to cache hits may be made for LRU accesses, but not for LRR accesses. Other embodiments may implement other combinations of replacement policies.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Figure 1:
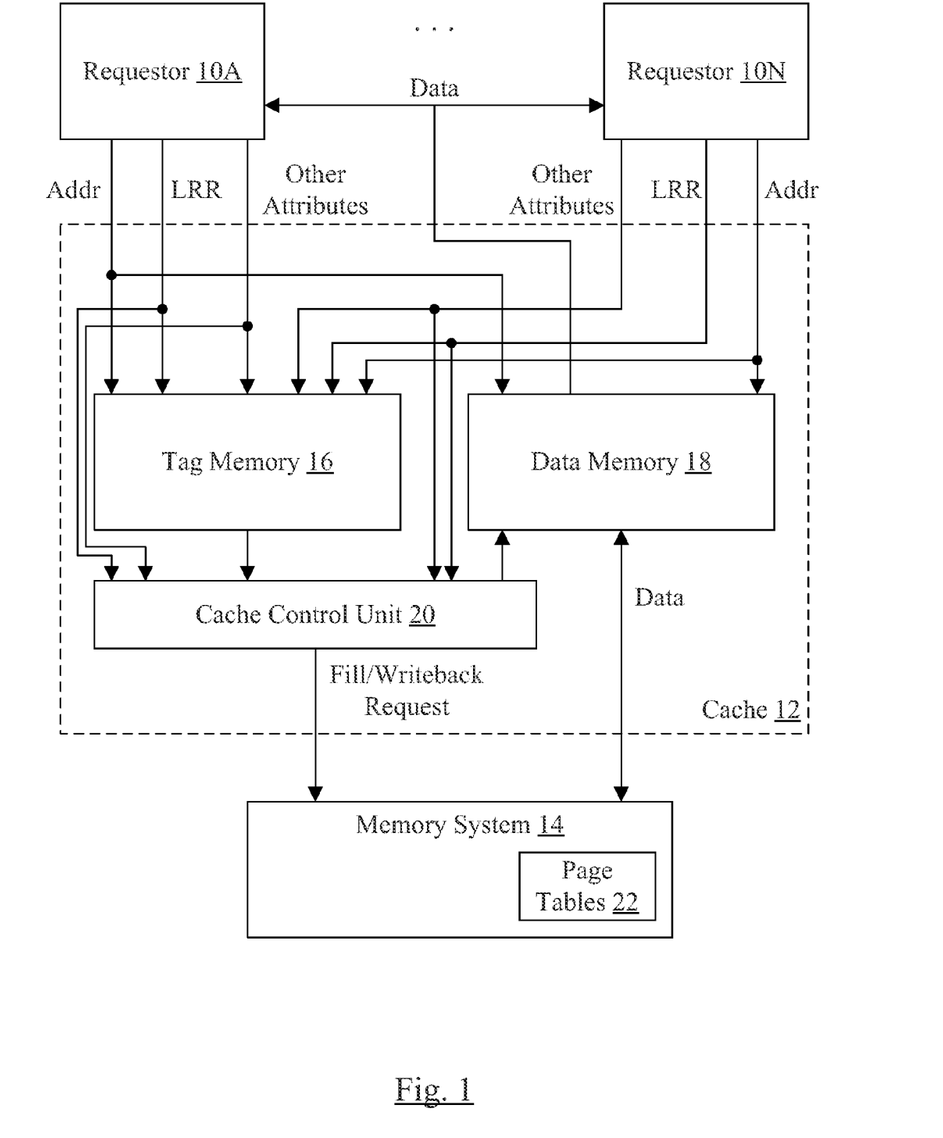
FIG. 1 is a block diagram of one embodiment of a system including a cache.

Turning now to FIG. 1, a block diagram of one embodiment of a system including one or more requestors 10A-10N, a cache 12, and a memory system 14 is shown. The requestors 10A-10N are coupled to the cache 12, which is further coupled to the memory system 14. The cache 12 in the illustrated embodiment includes a tag memory 16, a data memory 18, and a cache control unit 20. The tag memory 16 and data memory 18 are coupled to the cache control unit 20, and the data memory 18 is further coupled to transmit data to, and receive data from, the memory system 14 (Data in FIG. 1). The cache control unit 20 is configured to transmit fill and writeback requests to the memory system 14 as well. Each requestor 10A-10N is configured to transmit a request to the cache 12. The request includes and address (Addr in FIG. 1) that is coupled to the tag memory 16 and the data memory 18, an LRR attribute (LRR in FIG. 1) coupled to the tag memory 16 and the cache control unit 20, and various other attributes (Other Attributes in FIG. 1) coupled to the tag memory 16 and the cache control unit 20. The data memory 18 is coupled to transmit data to, and receive data from, the requestors 10A-10N (Data in FIG. 1).

The requestors 10A-10N may be configured to perform various operations in the system, and may access memory as part of their operation. For example, the requestors 10A-10N may be processors (either general purpose processors, or special purpose processors such as graphics processors). The processors may be configured to access memory to fetch instructions for execution, and may also be configured to access various data operands of the instructions in memory in response to executing the instructions. Other requestors may include fixed function circuitry (e.g. DMA controllers, peripheral interface controllers, etc.). The requestors 10A-10N may be physically separate circuitry (e.g. each requestor 10A-10N may be a separate instance of a processor). Alternatively, a requestor may be a logical entity such as a process or thread executing on a processor (along with the underlying processor), such that a single physical processor may include multiple logical requestors. A given requestor (physical or logical) may be identified by a requestor identifier (ID). For example, the requestor ID may be an identifier used by a processor as an identifier on an interface to which the cache 12 may also be coupled. Alternatively, the requestor ID may be a thread identifier (TID) assigned to a thread by the operating system that manages the threads/processes. The number of requestors 10A-10N included in a given embodiment may vary, from one to any number of requestors.

The requestors 10A-10N may be configured to generate requests to access memory. The requests may include an address and various attributes, including the LRR attribute mentioned above. The LRR attribute may be an indication of the selected replacement policy for the request, selected from two or more replacement policies supported by the cache 12 as discussed in more detail below. The other attributes may indicate a size of the request (e.g. in number of bytes), a read/write indication identifying the request as a read or write request, cacheability attributes (e.g. non-cacheable, cacheable writethrough, cacheable write back, etc.), the requestor ID, etc.

The requestors 10A-10N may be configured to transmit the requests to the cache 12. In the illustrated embodiment, the requests are shown as being provided directly to the cache 12. Such an embodiment may be implemented, e.g., with a multi-ported cache 12 in which each requestor 10A-10N has a dedicated port assigned to it. Other embodiments may implement a single-ported or multi-ported cache along with arbitration circuitry to arbitrate among the requests. Still other embodiments may include the cache 12 and the requestors 10A-10N coupled to an interface (e.g. a bus or a packet interface), and the requests may be transmitted over the interface. The mechanisms that are implemented by the interface for parallel transmission and/or arbitration of requests may be used in such embodiments.

As mentioned above, the attributes of the requests in the illustrated embodiment include the LRR attribute. In one embodiment, the cache 12 supports both LRR and LRU-type replacement policies concurrently for cache blocks stored in the cache 12. Thus, the requestors 10A-10N may identify the replacement policy to be used for a given request using the LRR attribute. For example, the LRR attribute may be a bit indicating, when set, that the LRR replacement policy is selected for the request and indicating, when clear, that the LRU replacement policy is selected. The opposite meanings of the set and clear states may be used, in other embodiments. Still other embodiments may support other combinations of two or more replacement policies, and thus other replacement policy indications may be used.

The cache control unit 20 may be configured to manage the cache blocks stored in the cache according to the selected replacement policies for the cache blocks. For example, the cache 12 may be associative, in which a given address maps to two or more cache block storage locations in the data memory 18 that may be eligible to store the cache block (so that it may be found on a subsequent access). The cache 12 may be set associative, in which N cache block storage locations are mapped to addresses having a the same value in a subset of the address bits referred to as an index, where N is an integer greater than one and less than the total number of cache block storage locations in the data memory 18. The N cache block storage locations forming a set corresponding to a given index are often referred to as "ways". Other embodiments may be fully associative, in which any cache block storage location may be mapped to any address. A set associative embodiment will be used as an example in some of the discussion below, but other embodiments of the cache 12 may have other configurations.

Managing the cache blocks according to the replacement policies may include monitoring the requests to the cache 12, as well as selecting a cache block to be replaced in response to a request that is a cache miss. Thus, the cache control unit 20 may be configured to maintain replacement data for each set, which may be updated in response to cache hits and may be processed to select a replacement cache block. For example, in one embodiment, the tags stored in the tag memory 16 for the cache blocks stored in the data memory 18 may include a replacement record for each cache block. The replacement record may comprise data that identifies a status of the cache block among other cache blocks in the set according to the replacement policies supported by the cache 12. More generally, the replacement record may comprise data that identifies the status of the cache block among the cache blocks eligible to be replaced in response to a given cache miss.

For example, in an LRU-type replacement policy, the replacement records may rank the cache blocks in the set according to recent use (e.g. the cache block that has been least recently used among the set may be ranked lowest, the second least recently used among the set may be ranked second lowest, up to the most recently used block). The "use" of a cache block may refer to an access (read or write) to the cache block. Thus, a cache block filled into the cache 12 in response to a cache access may be marked most recently used. Additionally, a cache block that is accessed and hits in the cache 12 may be upgraded to most recently used. The rankings of other cache blocks may be changed as well (e.g. blocks from the most recently used to the rank of the hitting cache block may be downgraded one step in the ranking, toward least recently used).

The LRU-type replacement policy may include "true LRU", in which the ranking of the cache blocks in the set is maintained accurately, such that at any given time the precise ranking from MRU to LRU is represented in the replacement records of the set. There are also variations of LRU that may be implemented in some cases. The variations may ease the implementation of LRU, e.g. so that timing requirements may be met, but at the expense of some accuracy. For example, the set may be divided into sections, and LRU state may be accurately kept within each section. Additionally, LRU state may be maintained among the sections. The cache block to be replaced in response to a cache miss may be the least recently used block in the least recently used section. Alternatively, a section may be selected randomly. Other variations include pseudo-LRU, in which the replacement records are a single bit that may be used in a binary-tree search algorithm to find a cache block that is not very recently used, but may not be the least recently used; segmented LRU in which two segments of LRU state are maintained (a protected segment and a probationary segment), cache hits are made MRU in the protected segment and the LRU block in the protected segment is made MRU in the probationary segment, and the LRU block in the probationary segment may be selected for replacement; variations which use probability to select a less recently used block but not necessarily the least recently used block; etc. Generally, the variations of the true LRU policy may have somewhat less accuracy, but may be based on recent use of the eligible cache blocks. In general, the description below may refer to LRU, and any variation of LRU may be implemented as the mentioned LRU.

The LRR replacement policy may rank the eligible cache blocks according to an amount of time that they have been stored in the cache, and may select the cache block that has been stored in the cache the longest to be replaced. Viewed in another way, the cache block that has been stored in the cache the longest among the eligible cache blocks is the cache block that was least recently replaced among the eligible cache blocks (that is, each other eligible cache block has been more recently replaced than the cache block that has been in the cache the longest). The eligible cache blocks in a set associative cache may be the cache blocks in the indexed set when a cache miss is detected. Thus, the LRR replacement policy may effectively treat a set as a FIFO, discarding the oldest cache block when a cache block is replaced in response to a cache miss.

The LRU replacement policies may generally perform fairly well (in terms of cache hit rates, for example) for most "random" access patterns (that is, access patterns that don't appear to have any predictable behavior). Once a block has been accessed more recently than another block, there is a good probability that the more recently accessed block will be accessed again (and a lower probability that the less recently accessed block will be accessed again). However, there may be some access patterns that may perform better with LRR. For example, patterns in which data is being consumed in a fairly linear fashion (in terms of increasing or decreasing addresses in memory) may benefit from LRR: These patterns tend to exhibit temporary reuse, but once the accesses have moved on to another cache block, returning to access the previous cache block again is less likely. Such a pattern may be exhibited by graphics processors rendering to a frame buffer, as they read and write rows of pixels or tiles in the frame. Another workload that may exhibit such a pattern is scientific code, which often processes large arrays of numbers (such that the complete working set doesn't fit in the cache) via a fairly regular access pattern through the array. Having the cache 12 that supports both LRU and LRR concurrently, and permits the policy to be selected on a request by request basis, may provide flexibility to handle different requestor workloads in an efficient fashion, in some embodiments.

Both LRU and LRR replacement algorithms rank the cache blocks in the set, and thus similar encodings may be used in the rankings. Thus, the replacement records in the set may be shared between the LRU and LRR replacement algorithms. In one embodiment, each tag may include an indicator indicating if the cache block is managed using LRU or LRR, in addition to the replacement record data.

In one embodiment, when a cache block is filled into the cache 12, the replacement records may be updated to make the cache block the MRU block in the set, independent of whether the LRR attribute indicates LRR or LRU. Making the newly allocated block MRU is consistent with both replacement policies. For accesses that hit in the cache 12, the replacement records in the set may be selectively updated: for LRR accesses, the replacement records may not be updated and for LRU accesses, the hitting cache block may be made MRU and the other replacement records may be updated appropriately. That is, the replacement data may be updated as defined by the implemented LRU replacement policy. In this fashion, over a series of accesses to a set, LRU blocks may tend to cluster in the MRU portion of the ranking and the LRR blocks may tend to cluster in the LRU portion of the ranking. Accordingly, the LRU block in the set may be replaced in response to a cache miss (LRU or LRR).

If a relatively large number of LRR cache blocks are accessed in a relatively short period of time, the LRR cache blocks may have a tendency to force LRU cache blocks out of the cache before the accesses to those LRU cache blocks are completed. To mitigate such operation, the cache 12 may be configured to limit a number of LRR cache blocks in a given set to a maximum number (referred to as a "quota" herein). The quota may be fixed or programmable, but may generally be less than the number of cache blocks in the set. When selecting a cache block to replace for a cache miss of an LRR request, the cache 12 may be configured to check the current number of LRR blocks in the set. If the current number equals the quota, the cache 12 may be configured to select an LRR block for replacement (e.g. the lowest ranked block in the replacement records that is tagged LRR). If the quota has not been met, the cache 12 may be configured to select the LRU block independent of whether it is tagged LRR or not.

The data memory 18 may comprise any random access memory (RAM), such as static RAM (SRAM). The data memory 18 may comprise a plurality of cache block storage locations, each cache block storage location comprising enough storage to store a cache block of data. The memory may be arranged so that a set of cache block storage locations may be selected for read/write operation responsive to an index portion of the input address (e.g. a number of bits of the address that may be decoded to uniquely select a set among the number of implemented sets). The cache block storage location that is to be accessed may be identified by the cache control unit 20 (e.g. responsive to detecting a cache hit for a request, responsive to allocating the cache block storage location to store a missing cache block, etc.). Data may be read from the accessed cache block storage location to return to the requestor for a read cache hit, or to transmit to the memory system 14 for a cache block evicted from the cache. Data may be written to the accessed cache block storage location for a write cache hit from a requestor or to complete a cache fill of a missing cache block into an allocated cache block storage location. In some embodiments, the data memory 18 may be a banked implementation and bank selection control may be provided from the cache control unit 20 as well.

The tag memory 16 may comprise a plurality of tag entries, each entry selected by a different value of the index mentioned above. The selected tag entry may store the tags that correspond to the set of cache block storage locations in the cache that are selected by the index. Each tag corresponds to a cache block in the respective cache block storage location, and may include the tag portion of the address of the corresponding cache block (i.e. the address, less the least significant bits that define an offset within the cache block and the bits that are used for the index), the replacement record for the corresponding cache block, the replacement indicator for the corresponding cache block, and various other state. In response to a request, the tag memory 16 may be configured to decode the index and output the tags to the cache control unit 20 for processing. In an embodiment, the tag memory 16 may also include tag comparison circuitry configured to compare the tags to the tag portion of the request address, and may provide the comparison results to the cache control unit 20. In another embodiment, the cache control unit 20 may compare the tags. The cache control unit 20 may also be configured to perform various tag updates (e.g. updating the replacement records, modifying the cache state as needed, or writing the entirety of a tag of a cache block being evicted for replacement by a missing cache block) by writing the tag entry.

The cache block may be the unit of allocation and deallocation in the cache 12. The cache block may be any desirable size, such as 32 bytes or 64 bytes, although larger and smaller cache block sizes may be supported in other embodiments. The boundaries between the cache blocks in memory may be boundaries of the block size (that is, the least significant N address bits of the first byte in the cache block may be zero for a $2^N$ byte cache block).

The memory system 14 may comprise any type of RAM memory. The memory system 14 may include additional levels of caching beneath the cache 12, if desired, and may include a memory controller and memory. The memory may be dynamic RAM (DRAM), such as synchronous DRAM (SDRAM), double data rate DRAM (DDR SDRAM, DDR2 SDRAM, DDR3 SDRAM, etc., including mobile versions of the SDRAMs such as mDDR3), RAMBUS DRAM (RDRAM), SRAM, etc.

The interface between the cache 12 and the memory system 14 is illustrated at a high level in FIG. 1. The actual interface may include any type of interface (bus-based, packet-based, etc.). There may be other devices that communicate with the memory system 14 as well. The cache 12 may be configured to transmit fill requests to read a missing cache block from the memory system 14, and may be configured to transmit write back requests to write a modified, evicted cache block back to the memory system 14. Data may be exchanged between the data memory 18 and the memory system 14.

As illustrated in FIG. 1, the memory system 14 may store a set of page tables 22. The page tables 22 may store translations that may translate virtual addresses used by the requestors 10A-10N to physical addresses used to access the cache 12 and memory. The requestors 10A-10N may read translations from the page tables 22 as needed for translating the addresses of memory accesses. The page tables 22 may also have various attributes of the pages, as discussed in more detail below.

It is noted that, in some embodiments, one or more of the requestors 10A-10N may also include internal caches above the cache 12. For example, a processor may have internal instruction and data caches, and the cache 12 may be an L2 cache. The cache 12 may be placed at any level of a cache hierarchy in a system, in various embodiments.

It is noted that, in some embodiments, one or more of the components illustrated in FIG. 1 may be integrated onto a single semiconductor substrate as in integrated circuit "chip" with any other components shown in FIG. 1 and/or other components. Any level of integration or discrete implementation may be used. For example, in an embodiment the requestors 10A-10N and the cache 12 may be integrated, and in an embodiment the memory controller of the memory system 14 may be integrated.

Figure 2:
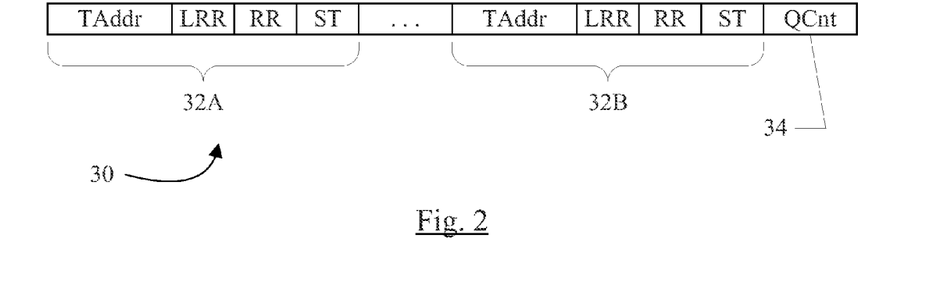
FIG. 2 is a block diagram of one embodiment of a tag entry corresponding to a set in the cache.

Turning next to FIG. 2, a block diagram of one embodiment of a tag entry 30 from the tag memory 16 is shown. The tag entry 30 may include a tag for each cache block storage location in a set, such as tag 32A and tag 32B in FIG. 2. The tag entry 30 may also include a quota count (QCnt) 34.

Each tag 32A-32B includes the tag portion of the address (TAddr in FIG. 2), to be compared against input request addresses. Each tag 32A-32B also includes an LRR bit, which may be the replacement indicator for the cache block in this embodiment. The LRR bit may be set to indicate an LRR block and clear to indicate an LRU block, or vice versa. Embodiments that support more than two replacement policies may implement more than one bit for the replacement indicator. The replacement record (RR) may be the replacement data for the cache block. The state (ST) may include any other desired tag state (e.g. validity of the cache block, whether the cache block is modified, coherence state for embodiments that include cache coherence, etc.).

The replacement records may be encoded in any fashion. For example, for N cache blocks in a set, the replacement records may be encoded as numbers from 0 to N−1. Zero may be the MRU, and each increasing number may be closer to the LRU until N−1, which identifies the LRU. Alternatively, N−1 may be the MRU and each decreasing number may be closer to the LRU until reaching 0, which identifies the LRU. In another embodiment, the replacement records may be one-hot bit vectors, with the location of the bit in the vector indicating the rank. A bit vector may be updated to modify the rank by shifting the bit within the vector (e.g. when another cache block is made MRU, the replacement records that are updated may shift their bits by one bit position toward LRU).

The QCnt 34 may store a count of the number of cache blocks in the set that are LRR cache blocks (e.g. the number of set LRR bits in the cache tags 32A-32B). Other embodiments may detect the quota by examining the LRR bits directly, or in some other fashion, and the QCnt 34 may not be included in such embodiments.

Figure 3:
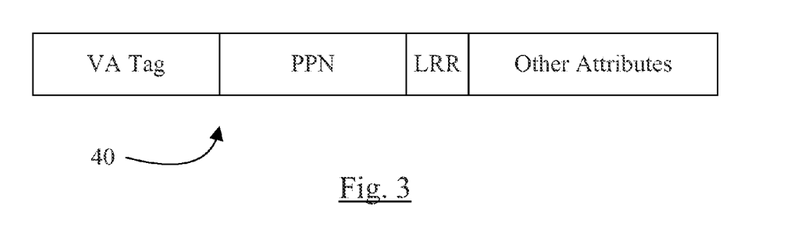
FIG. 3 is a block diagram of one embodiment of a page table entry.

Turning now to FIG. 3, a block diagram of one embodiment of a page table entry 40 that may be stored in the page tables 22 is shown. The page table entry 40 may be used as part of any address translation mechanism. In some embodiments, multiple page table accesses in a hierarchical fashion may be used to map a virtual address to a physical address. In such embodiments, the entire virtual address (except for the page offset portion) may be consumed in the look up process and the virtual address tag (VA Tag) may not be needed. In other embodiments, a portion of the virtual address that is not used to look up the page table entry may be matched against the virtual address tag field of the entry 40. A physical page number (PPN) field may store the page portion of the physical address (which may be concatenated with the page offset portion of the virtual address to form the physical address). Any page size may be supported (e.g. 4 kilobytes, 8 kilobytes, or larger such as 1-4 Megabytes, or even larger). In some embodiments, more than one page size may be supported. The page table entry 40 also includes an LRR attribute, and may include other attributes (Other Attributes field). The other attributes may include, for example, cacheability, writethrough or writeback, privilege level requirements, a valid bit, read/write permissions, etc.

If page table entry 40 is implemented, the requestors 10A-10N may be configured to determine the LRR attribute for a request from the LRR attribute in its page table entry. The requestors 10A-10N may be configured to cache the translations and corresponding attributes that are currently in use (e.g. in a translation lookaside buffer, or TLB) and to output the LRR attribute for a request from the TLB along with the physical page number. The requestors 10A-10N may be configured to transmit the LRR attribute to the cache 12 with the request.

Figure 4:
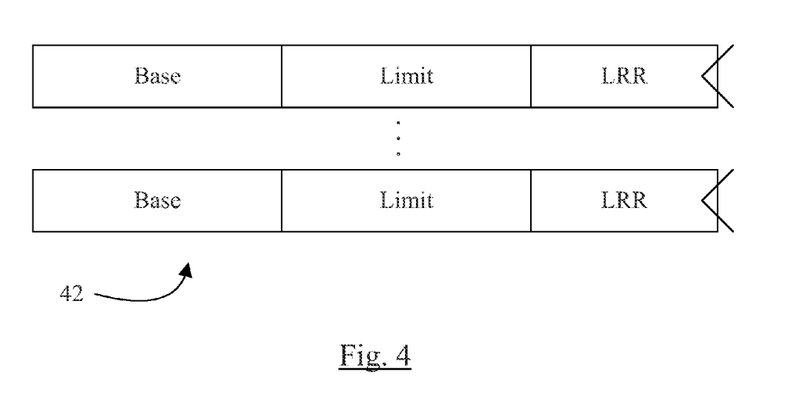
FIG. 4 is a block diagram illustrating one or more registers defining address ranges and least recently replaced (LRR) attributes.

FIG. 4 is a block diagram of an embodiment of one or more registers 42 that may be programmed with one or more address ranges and corresponding LRR attributes. The address range may be expressed in any fashion. For example, as shown in FIG. 4, the address range may be represented as a base address and a limit. The range may also be represented as a base address and a size, or may be represented in any other fashion that defines the range. The register(s) 42 may be used at any point in an address generation and translation (if applicable) for a request to determine the LRR attribute of the request. For example, a memory management unit (MMU) in a requestor 10 may include one or more registers 42, and translated addresses may be compared to the base and limit fields to determine if the address is in the address range. If the address is in the range, the LRR attribute may be read from the register 42 and associated with the request.

In some embodiments, one or more registers 42 may be used to define the LRR address ranges, and addresses outside the range may be identified as LRU requests. In such an embodiment, the registers 42 need not store the LRR attribute. Alternatively, a given range may be used to identify either an LRU or LRR range, and the LRR attribute may be included in the registers 42 as shown.

Figure 5:
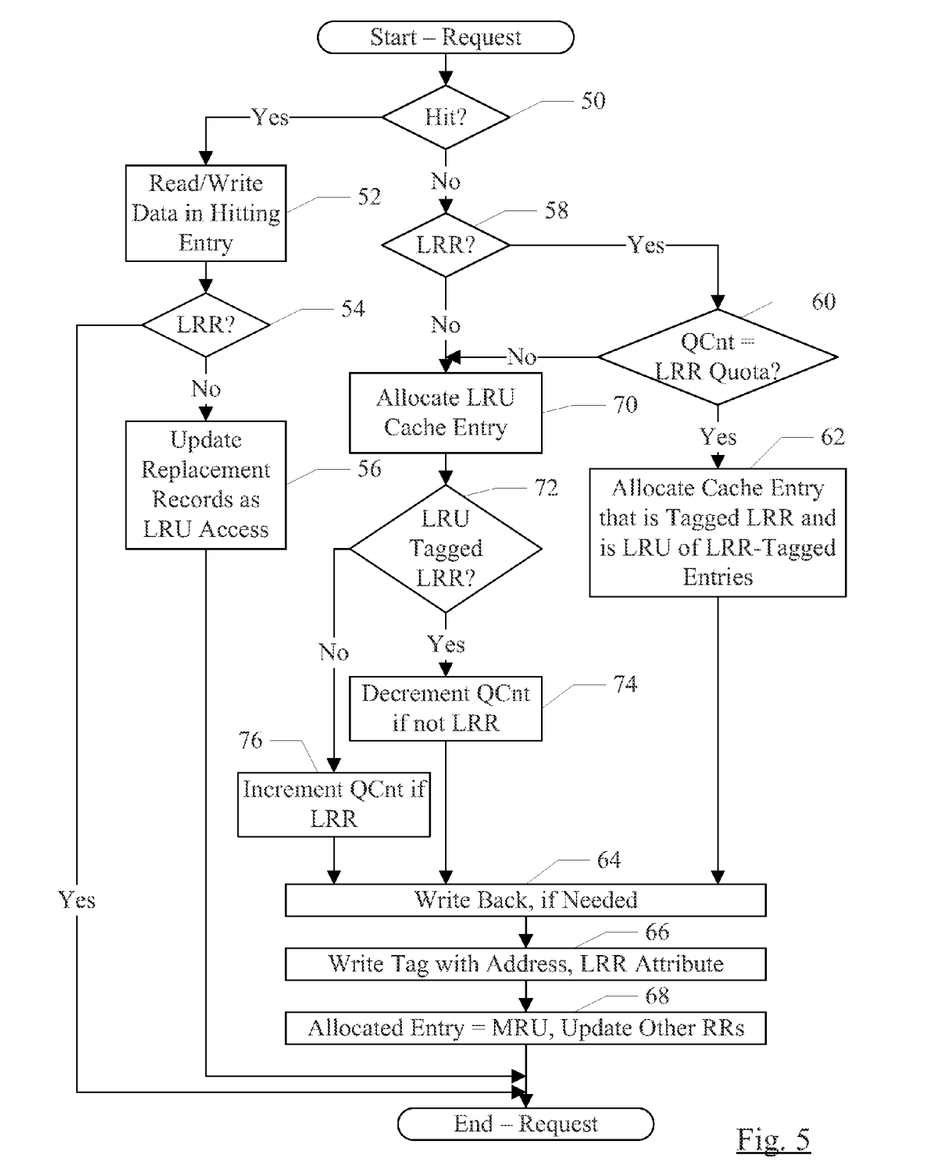
FIG. 5 is a flowchart illustrating operation of one embodiment of the cache shown in FIG. 1 for a request.

Turning now to FIG. 5, a flowchart is shown illustrating operation of one embodiment of the cache 12 (and more particularly the cache control unit 20) in response to a request from a requestor 10A-10N. While the blocks are shown in a particular order for ease of understanding, other orders may be used. Blocks may be performed in parallel in combinatorial logic circuitry in the cache 12/cache control unit 20. Blocks, combinations of blocks, and/or the flowchart as a whole may be pipelined over multiple clock cycles. The cache 12/cache control unit 20 may be configured to implement the operations shown in FIG. 5.

The cache control unit 20 may be configured to detect a cache hit or miss for the request (decision block 50). Generally, a request may be a hit in the cache if the addressed cache block is stored in the cache at the time of the request, and a miss if the addressed cache block is not stored in the cache at the time of the request. If the request is a hit (decision block 50, "yes" leg), the data memory 18 may be configured to supply data from the hit cache block for a read, or write data into the hit cache for a write (block 52). If the LRR attribute of request indicates LRR (decision block 54, "yes" leg), the cache control unit 20 may be configured not to update the replacement records in the set. If the LRR attribute of the request indicates LRU (decision block 54, "no" leg), the cache control unit 20 may be configured to update the replacement records of the set as an LRU access (block 56). For example, the hit cache block may be made MRU, and each cache block between the current MRU and the previous ranking of the hit cache block may be downgraded by one (toward LRU). Alternatively, the LRR bit in the cache tag of the hit entry may control whether or not the replacement records are updated rather than the LRR attribute of the request. In most cases, the LRR attributes in the request and the LRR bit for the hitting cache block may match, but the cache 12 may not require such matching in some embodiments.

If the request is a miss in the cache 12 (decision block 50, "no" leg), the cache control unit 20 may be configured to allocate a cache block storage location to store the missing cache block. In most cases, the LRU cache block may be replaced (and its cache block storage location may be allocated for the missing cache block). However, in this embodiment, the quota may be implemented for the LRR blocks in a set. Accordingly, if the request has the LRR attribute indicating LRR (decision block 58, "yes" leg), and the QCnt for the set is at the LRR quota (decision block 60, "yes" leg), the cache control unit 20 may be configured to allocate the cache block storage location storing a cache block that is tagged with the LRR bit and that is the LRU of the cache entries that are tagged with the LRR bit (block 62). Viewed in another way, the cache control unit 20 may allocate the cache block storage location that is storing the LRR-tagged cache block that is ranked closest to the LRU cache block among the LRR-tagged cache blocks. Effectively, the cache control unit 20 may scan the ranking from the LRU cache block upward, searching for the first occurrence of a set LRR bit in the tag. It is noted that the scanning may be implemented in parallel combinatorial logic, using known logic design techniques. The allocated block is the oldest LRR block in the cache 12. In cases in which the quota is not implemented, blocks 58, 60, and 62 may be eliminated. The cache control unit 20 may be configured to write back the replaced cache block, if needed (e.g. the cache block is modified-block 64). The cache control unit may be configured to write the tag corresponding to the allocated cache block storage location with the address of the missing cache block, and may set or clear the LRR bit based on the LRR attribute of the missing request (block 66). The cache control unit 20 may also be configured to update the replacement records to make the allocated cache block storage location the MRU of the set (block 68), downgrading each other cache block in the set between the MRU and the replaced cache block's previous ranking by one position toward LRU.

On the other hand, if the LRR attribute of the request indicates LRU (decision block 58, "no" leg), or the LRR attribute indicates LRU but the quota has not been reached for the set (decision block 58, "yes" leg and decision block 60, "no" leg), the cache control unit 20 may be configured to allocate the cache block storage location that is ranked LRU (block 70). If the cache block being replaced in the allocated cache block storage location is tagged as an LRR block (decision block 72, "yes" leg), the cache control unit 20 may be configured to decrement the QCnt of the set if the missing request is not also indicated as LRR in the LRR attribute, since the number of LRR blocks in the set is being reduced (block 74). If the cache block being replaced in the allocated cache block storage location is tagged as an LRU block (decision block 72, "no" leg), the cache control unit 20 may be configured to increment the QCnt of the set if the missing request is indicated as LRR in the LRR attribute, since the number of LRR blocks is being increased (block 76). In either case, the cache control unit 20 may be configured to generate a write back for the replaced cache block, if necessary (block 64), to write the tag of the allocated cache block storage location with the address and LRR attribute (block 66), and to update the replacement records to indicate that the allocated cache block storage location is MRU (block 68).

The cache 12 may also issue a fill to the memory system 14, and at a subsequent point the cache block may be written to the cache. The cache 12 may validate the cache block in the tag at that point (not shown in FIG. 5).

The flowchart of FIG. 5 illustrates operation of the cache 12 in response to a request. It is noted that the cache 12 may be configured to operate on multiple requests in parallel. Additionally or alternatively, operation illustrated in FIG. 5 may be pipelined, and thus the cache 12 may have multiple requests at different points in the processing.

Figure 6:
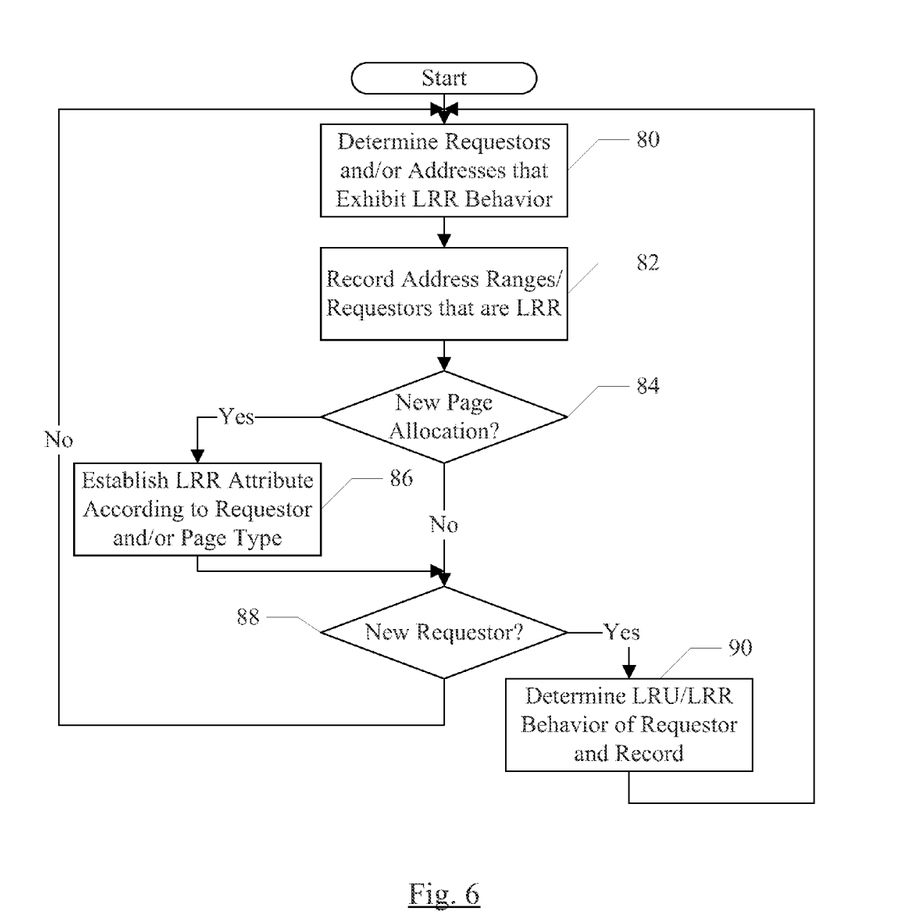
FIG. 6 is a flowchart illustrating one embodiment of establishing LRR attributes for use in the cache.

Turning now to FIG. 6, a flowchart is shown illustrating one embodiment of establishing LRR attributes for use with the cache 12. The flowchart of FIG. 6 may, e.g., by implemented as software instructions executed on one or more of the requestors 10A-10N. The software may be part of the controlling code of the system (e.g. operating system code, or other code that controls the overall operation of the system). The software may include instructions which, when executed, cause the system to perform the operation illustrate in FIG. 6.

The software may determine the requestors and/or addresses in the memory that may exhibit behavior that would benefit from the LRR replacement policy (block 80). For example, graphics requestors may benefit, as may other requestors that may exhibit fairly linear access patterns (e.g. scientific processing programs that are expected to process large arrays of data sets that may not fit in the cache 12). Similarly, if an address range is allocated to the frame buffer for graphics, or to some other device or data structure the requestors are expected to access in an LRR fashion, the address range may be identified as an LRR address range.

The software may record which address ranges/requestors are LRR (block 82). The address ranges may be recorded in the registers 42, for example, in embodiments that implement the registers 42. Alternatively, the address ranges may be recorded in a data structure accessible to the page management software that controls the allocation of physical pages to virtual addresses. The page management software may use the information when allocated a new page, as discussed below. The requestors may be identified in a data structure, and/or the requestors that are identified as LRR requestors may be programmed to output the LRR attribute indicating LRR for their requests. Requestors may be identified by a requestor ID, for example, or by a process or thread ID.

In embodiments that implement the LRR attribute in the page table entries 40, if a new page allocation is requested from the page management software (decision block 84, "yes" leg), the page management software may establish the LRR attribute for the page based on the recorded address ranges and/or the recorded requestors (block 86). That is, if the page allocation is requested by, or on behalf of, a requestor that is identified as an LRR requestor, the page management software may make the LRR attribute in the page table entry 40 indicate LRR. If the requested page allocation includes an address within the recorded ranges, the page management software may make the LRR attribute in the page table entry 40 indicate LRR. Otherwise, the page management software may make the LRR attribute in the page table entry 40 indicate LRU.

In embodiments that associate requestors with LRR behavior, if a new requestor is added (e.g. a new process or thread-decision block 88, "yes" leg), the software may determine the LRU/LRR behavior of the requestor and record the data for use as described above (block 90). It is noted that, in some embodiments, the software may permit an application or driver to identify whether or not its cacheable memory accesses are LRR, or to indicate whether any memory that they are requesting to be allocated should be LRR. This mechanism may comprise another way to identify an LRR requestor or address range.

System and Computer Accessible Storage Medium

Figure 7:
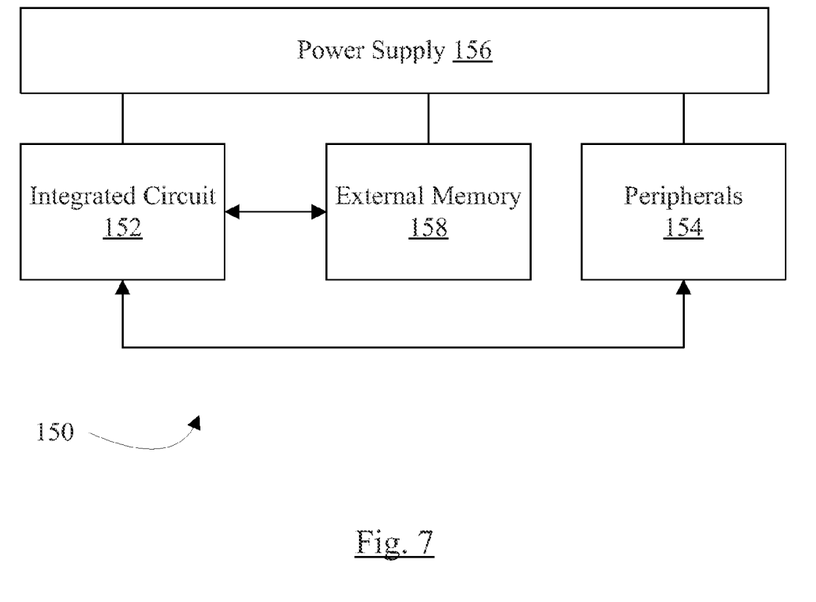
FIG. 7 is a block diagram of one embodiment of a system.

Turning next to FIG. 7, a block diagram of one embodiment of a system 150 is shown. The system 150 may be another embodiment of the system illustrated in FIG. 1. In the illustrated embodiment, the system 150 includes at least one instance of an integrated circuit 152 coupled to one or more peripherals 154 and an external memory 158. The integrated circuit 152 may include the requestors 10A-10N, the cache 12, and the memory controller from the memory system 14, in one embodiment. The external memory 158 may include the memory from the memory system 14. A power supply 156 is also provided which supplies the supply voltages to the integrated circuit 152 as well as one or more supply voltages to the memory 158 and/or the peripherals 154. In some embodiments, more than one instance of the integrated circuit 152 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

Figure 8:
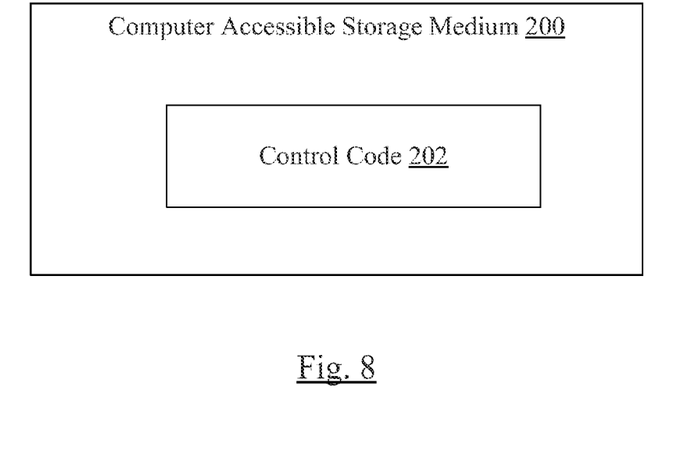
FIG. 8 is a block diagram of one embodiment of a computer accessible storage medium.

Turning now to FIG. 8, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. The computer accessible storage medium 200 in FIG. 8 may store control code 202, which may include the code described above with regard to FIG. 6 (including the page management software as well). Generally, the computer accessible storage medium 200 may store any set of instructions which, when executed, implement a portion or all of the operation shown in FIG. 6. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A system comprising:
one or more requestors configured to generate requests that each include an address and a replacement policy attribute identifying a selected replacement policy; and
a set associative cache configured to support a least recently replaced (LRR) replacement policy and a variation of a least recently used (LRU) replacement policy for cache blocks in a given set, wherein the set associative cache is configured to selectively modify replacement data corresponding to the set accessed by a request responsive to the replacement policy attribute associated with the request, and wherein the LRR replacement policy causes selection of a selected cache block in the set for replacement, wherein the selected cache block is the cache block that has been stored in the cache longer than the other cache blocks in the set, and wherein the set associative cache is configured to modify the replacement data responsive to a first request that hits in the cache and has an LRU replacement policy attribute, and wherein the set associative cache is configured not to modify the replacement data responsive to a second request that hits in the cache and has an LRR replacement policy attribute.

2. The system as recited in claim 1 wherein the one or more requestors comprise physical components coupled to the cache.

3. The system as recited in claim 1 wherein the one or more requestors comprise logical requestors executing on one or more processors that are coupled to the cache.

4. The system as recited in claim 1 wherein the replacement policy attribute is determined, at least in part, responsive to which of the one or more requestors initiated the request.

5. The system as recited in claim 1 wherein the set associative cache is configured to control replacement of a cache block in the set for a cache miss responsive to the replacement data and replacement policy indicators in the set.

6. A method comprising:
receiving a first request in a cache, the first request including a least recently used (LRU) replacement attribute specifying that replacement of a first cache block corresponding to the first request is managed according to a replacement policy based on recent cache block use;
updating replacement data corresponding to a group of cache block storage locations that are eligible to store the first cache block responsive to detecting a hit of the first request for one of the cache block storage locations in the group;
receiving a second request in the cache, the second request including a least recently replaced (LRR) replacement attribute specifying that replacement of a second cache block corresponding to the second request is managed according to a least recently replaced policy, wherein the LRR policy causes selection of a selected cache block in the group for replacement, wherein the selected cache block is the cache block that has been stored in the cache longer than the other cache blocks in the group; and
not updating replacement data corresponding to the group of cache block storage locations that are eligible to store the second cache block responsive to detecting the hit of the second request for one of the cache blocks in the group and further responsive to the LRR replacement attribute.

7. The method as recited in claim 6 further comprising:
receiving a third request in the cache, the third request missing in the cache;
allocating a cache block storage location from the group to store a cache block corresponding to the third request; and
updating the replacement data in the cache that corresponds to the group of eligible cache block storage locations for the third request independent of the replacement policy attribute of the third request.

8. The method as recited in claim 7 wherein the updating the replacement data is performed according to the replacement policy that is based on recent use.

9. The method as recited in claim 6 further comprising limiting a number of cache block storage locations allocated to the LRR replacement policy to a specified maximum.

10. The method as recited in claim 9 wherein the specified maximum is a number of cache block storage locations allocated to the LRR replacement policy per group in the cache, and wherein the method further comprises tracking the number in each group using a counter stored with each group.

11. The method as recited in claim 10 wherein the cache is set associative, and wherein each group is a set.

12. The method as recited in claim 6 wherein the first request is issued by a first requestor, and wherein the second request is issued by a second requestor different from the first requestor.

13. The method as recited in claim 12 wherein the first requestor and the second requestor are physical components coupled to the cache.

14. The method as recited in claim 12 wherein the first requestor and the second requestor are logical requestors executing on one or more processors that are coupled to the cache.

15. A method comprising:
determining which requestors of a plurality of requestors exhibit cache access behavior that is associated with a least recently replaced (LRR) replacement policy, wherein the LRR replacement policy causes selection of a selected cache block in a set of the cache for replacement, wherein the selected cache block is the cache block that has been stored in a cache longer than the other cache blocks in the set;
associating the LRR replacement policy with the determined requestors;
associating a second replacement policy that is based on recent use with remaining requestors of the plurality of requestors; and
managing cache block replacement in a cache responsive to the replacement policies associated with the requestors, wherein each cache request to the cache includes a replacement policy attribute specifying the replacement policy associated with the requester that generated the cache request, and wherein the managing comprises selectively modifying replacement data corresponding to the set accessed by the cache request responsive to the replacement policy attribute associated with the cache request, and wherein the selectively modifying comprises modifying the replacement data responsive to a first request that hits in the cache and has an LRU replacement policy attribute, and wherein the selectively modifying comprises not modifying the replacement data responsive to a second request that hits in the cache and has an LRR replacement policy attribute.

16. The method as recited in claim 15 further comprising:
allocating a page in a memory system for use by a requestor;
associating the corresponding cache replacement policy with the page; and
writing a page table entry to a page table to translate a virtual address to a physical address of the page, the page table entry including an attribute identifying the corresponding cache replacement policy.

17. The method as recited in claim 15 further comprising programming a plurality of registers to identify address ranges within a memory address space, wherein the programming comprises associating a cache replacement policy for each address range.

18. The method as recited in claim 15 wherein the plurality of requestors are physical components coupled to the cache.

19. The method as recited in claim 15 wherein the plurality of requestors are logical requestors executing on one or more processors that are coupled to the cache.

\* \* \* \* \*